US010755027B2

United States Patent
Nicholson et al.

(10) Patent No.: US 10,755,027 B2
(45) Date of Patent: Aug. 25, 2020

(54) GESTURE AMBIGUITY DETERMINATION AND RESOLUTION

(71) Applicant: LENOVO (Singapore) PTE. LTD., New Tech Park (SG)

(72) Inventors: John Weldon Nicholson, Cary, NC (US); Jianbang Zhang, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 59 days.

(21) Appl. No.: 15/001,022

(22) Filed: Jan. 19, 2016

(65) Prior Publication Data
US 2017/0205888 A1 Jul. 20, 2017

(51) Int. Cl.
| | | |
|---|---|---|
| G06F 3/01 | (2006.01) | |
| G06K 9/00 | (2006.01) | |
| G06F 40/10 | (2020.01) | |
| G06K 9/20 | (2006.01) | |
| G06F 3/0488 | (2013.01) | |
| G06F 40/103 | (2020.01) | |
| G06F 40/274 | (2020.01) | |

(52) U.S. Cl.
CPC .......... *G06F 40/10* (2020.01); *G06F 3/04883* (2013.01); *G06F 40/103* (2020.01); *G06K 9/00355* (2013.01); *G06K 9/2081* (2013.01); *G06F 40/274* (2020.01)

(58) Field of Classification Search
CPC .... G06F 3/0482; G06F 3/017; G06K 9/00335
See application file for complete search history.

(56) References Cited

U.S. PATENT DOCUMENTS

| 9,311,965 B2* | 4/2016 | Hwang | G06F 3/04847 |
|---|---|---|---|
| 2003/0182630 A1* | 9/2003 | Saund | G06F 3/04883 715/273 |
| 2005/0251746 A1* | 11/2005 | Basson | G06F 3/012 715/708 |
| 2009/0295737 A1* | 12/2009 | Goldsmith | G06F 3/018 345/169 |
| 2015/0160794 A1* | 6/2015 | Huang | G06F 3/0482 715/810 |
| 2017/0205888 A1* | 7/2017 | Nicholson | G06K 9/00355 |

OTHER PUBLICATIONS

CN103309448A_ENG.pdf, inventor : He, Liang; Google machine translation of CN103309448A, published Sep. 18, 2013.*

* cited by examiner

*Primary Examiner* — Wing H Chow
(74) *Attorney, Agent, or Firm* — Kunzler Bean & Adamson

(57) ABSTRACT

Systems, apparatuses, methods, and program products are disclosed. An apparatus may include a processor configured to determine whether a user-input gesture is an ambiguous gesture, present a set of candidate gestures corresponding to the user-input gesture, in response to the user-input gesture being an ambiguous gesture, and resolve the ambiguous gesture based on user-input. The processor may magnify an area around the ambiguous gesture, wherein presenting the set of candidate gestures includes displaying the candidate gestures within the magnified area. The apparatus may include a memory that stores code executable by the processor. The apparatus may also include an input device that receives a user-input gesture and a display device.

20 Claims, 7 Drawing Sheets

GESTURE AMBIGUITY DETERMINATION AND RESOLUTION

BACKGROUND

Field

The subject matter disclosed herein relates to input gestures and more particularly relates to detecting and resolving an ambiguous gesture input by a user.

Description of the Related Art

Handheld devices often have relatively small screens resulting in a user entering relatively small gestures thereon. Small gestures can be difficult to interpret. For example, a strikethrough gesture may be similar to a tap gesture. Accordingly, gesture recognizers may misinterpret an ambiguous gesture and/or do nothing when the input is ambiguous, thereby requiring the user to re-enter the gesture.

BRIEF SUMMARY

An apparatus for gesture ambiguity determination and resolution is disclosed. A method and computer program product also perform the functions of the apparatus.

The apparatus may include an input device that receives a user-input gesture, a display device, a processor, and a memory that stores code executable by the processor, the code causing the processor to determine whether user-input gesture is an ambiguous gesture, present a set of candidates gestures corresponding to the user-input gesture, in response to the user-input gesture being ambiguous gesture, and resolve the ambiguous gesture based on user input.

In certain embodiments, the processor may further magnify an area encompassing the ambiguous gesture, wherein presenting the set of candidate gestures includes displaying the set of candidates gestures within the magnified area. Magnifying the area encompassing the ambiguous gesture may include selecting an amount of magnification based on one of a size of the user-input gesture and a size of content associated with the user-input gesture.

In some embodiments, determining whether a user-input gesture is an ambiguous gesture includes determining based on one of a size of the user-input gesture and a size of content associated with the user-input gesture. In other embodiments, determining whether he a user-input gesture is an ambiguous gesture may include determining a recognition confidence level for the user-input gesture and identifying the user-input gesture as an ambiguous gesture in response to the recognition confidence level being below a threshold level.

In some embodiments, presenting the set of candidate gestures includes overlaying the candidate gestures on content associated with the user-input gesture. Further, resolving the ambiguous gesture based on user input may include receiving a user selection of an overlaid candidate gesture. The memory may further include code executable by the processor to mark the ambiguous gesture.

The method may include determining, by use of a processor, whether a user-input gesture is an ambiguous gesture, presenting a set of candidate gestures corresponding to the user-input gesture in response to the user-input gesture being an ambiguous gesture, and resolving the ambiguous gesture based on user input. The method may further include magnifying an area encompassing the ambiguous gesture.

In certain embodiments, presenting the set of candidate gestures may include displaying the set of candidate gestures within the magnified area. In some embodiments, magnifying the area encompassing the ambiguous gesture include selecting an amount of magnification based on a size of the user-input gesture. The method may also include identifying content associated with the user input gesture, wherein magnifying the area encompassing the ambiguous gesture and because gesture includes selecting an amount of magnification based on a size of the associated content.

In some embodiments, the method includes identifying content associated with the user gesture and identifying a size of the associated content. Further, determining whether a user-input gesture is an ambiguous gesture may include determining whether the size of the associated content is below a threshold size. In certain embodiments, the method may include measuring a size of the user-input gesture, wherein determining whether a user-input gesture is an ambiguous gesture includes determining whether the size of the user-input gesture is below a threshold size. Presenting a set of ambiguous gestures may include overlaying the set of ambiguous gestures on the associated content.

In certain embodiments, determining whether a user-input gesture is an ambiguous gesture includes calculating a recognition confidence level for the user-input gesture and identifying a user-input gesture as an ambiguous gesture in response to the recognition confidence level being below a threshold level. In certain embodiments, resolving the ambiguous gesture based on user input includes receiving a user selection of a candidate gesture and performing an action corresponding to the selected candidate gesture. The method may further include modifying a gesture recognition routine based on the user selection.

The computer program product includes a computer readable storage medium that stores code executable by a processor, the executable code including code to perform: determining whether a user-input gesture is an ambiguous gesture, magnifying an area encompassing the ambiguous gesture in response to the user-input gesture being an ambiguous gesture, presenting a set of candidate gestures within the magnified area, and resolving the ambiguous gesture based on user input. In certain embodiments, determining whether a user-input gesture is an ambiguous gesture includes determining based on a size of the user-input gesture, a size of content associated with the user-input gesture, or a recognition confidence level for the user-input gesture. In certain embodiments, resolving the ambiguous gesture based on user input includes one of receiving a user selection of a candidate gesture and receiving an additional user-input gesture within the magnified area.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
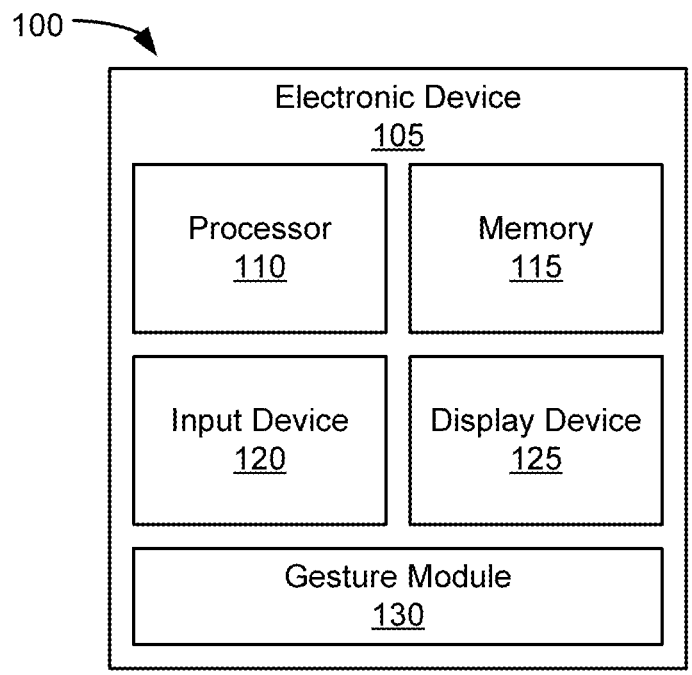
FIG. 1 is a schematic block diagram illustrating one embodiment of a system for gesture ambiguity detection and resolution.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the systems, apparatus, method, and program products described herein detect and resolve an ambiguous user-input gesture by determining whether a user-input gesture is an ambiguous gesture, presenting a set of candidate gestures corresponding to the ambiguous gesture, and resolving the ambiguous gesture based on additional user input. Determination of what is an ambiguous gesture may include analysis of one or more properties of the user-input gesture and/or content associated with the user-input gesture.

A user-input gesture may be an ambiguous gesture if the gesture is small, for example, less than a threshold number of pixels or screen distance. The gesture size threshold may be universal across all supported gestures or, alternatively, may be different for each supported gesture. Additionally, a user-input gesture may be an ambiguous gesture if the associated content is small (e.g., less than a threshold size). Further, the user-input gesture may be ambiguous gesture based on a recognition confidence level, for example generated by a gesture recognizer. If the confidence levels within a "gray area," then the user-input gesture may be ambiguous. Additionally, if multiple gestures are recognized to a similar confidence level, then the user-input gesture may be ambiguous.

Another aspect of the present disclosure is a confirmation mechanism for selecting among candidate gestures (e.g., possible interpretations of the ambiguous gesture). The candidate gestures may be overlaid atop content near the location where the user entered the ambiguous gesture. This enables the user to tap or select the correct gesture if they do not want to perform it again. In some embodiments, the candidate gestures may be faded until the user hovers over a label for the gesture, at which point they become solid and/or bold. The gesture could be confirmed by tapping on the label. Otherwise the user may again performing the ambiguous gesture, and the candidate gestures may disappear from the screen.

An additional aspect of the present disclosure is to display a floating magnification window in the area around the ambiguous gesture. The amount of zoom for the magnification window may be proportional to the gesture size. Each gesture may have an ideal or target size (in pixels). For example, if an ambiguous strikethrough gesture is eight pixels long and the target is 100 pixels, then the magnification window which show an area magnified 12.5 times. In addition to this targeted amount of magnification, the underlying content may also be taken into account, wherein the targeted magnification is altered such that, e.g., in the case of text, the whole word fits into the magnification window. The input gesture is not necessarily in the center of the magnification window. As a result, the user is presented with the context in which the ambiguous gesture was received. Further, the ambiguous gestures may be overlaid within the magnification window. Thus, the user can easily see the ambiguous gesture and can more clearly enter the ambiguous gesture within the magnification window, or select a candidate gesture matching the intent of the entered gesture.

FIG. 1 is a schematic block diagram illustrating a system 100 for gesture ambiguity detection and resolution. The system comprises an electronic device 105. In one embodiment, the electronic device 105 includes a processor 110, a memory 115, a gesture module 130, an input device 120, and a display device 125.

The electronic device 105 may be any digital device capable of executing computing processes using a microprocessor, microcontroller, or other processing device, including, but not limited to, a general-purpose computing device, a special-purpose (dedicated) computing device, and the like. In some embodiments, the electronic device 105 may be a personal computer, including, but not limited to, a mobile phone, a smart phone, a tablet computer, a laptop computer, a handheld computer, a wearable computer, a gaming console, or the like.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a FPGA, or similar programmable controller. In certain embodiments, the processor 110 may include a plurality of processing units, such as a plurality processing cores, a plurality of CPUs, a plurality of microcontrollers, or the like. In some embodiments, the processor 110 executes instructions stored in the memory 115 to perform the methods and routines described herein. The processor 110 is communicatively coupled to the memory 115, the input device 120, the display device 125, and the gesture module 130.

The memory 115, in one embodiment, is a computer readable storage medium. In some embodiments, the memory 115 includes volatile computer storage media. For example, the memory 115 may include a random access memory (RAM), including dynamic RAM (DRAM), synchronous dynamic RAM (SDRAM), and/or static RAM (SRAM). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

In some embodiments, the memory 115 stores additional data relating to gesture ambiguity detection and resolution. For example, the memory 115 may store a library of supported gestures, and the like. In some embodiments, the memory 115 also stores program code and related data, such as an operating system or other controller algorithms operating on the electronic device 105.

The input device 120, in one embodiment, may comprise any known computer input device including a touch panel, a button, a keyboard, and the like. The input device 120 is configured to receive input from a user, for example touch input, key press input, and the like. In certain embodiments, the input device 120 may include a microphone or other suitable device for receiving voice input from the user. For example, the user may speak one or more commands, wherein input device 120 receives the one or more commands as voice input.

In one embodiment, the input device 120 includes a touch-sensitive portion, such as a touch-sensitive input panel, configured to receive touch input from the user, such as an input gesture. In some embodiments, at least the touch-sensitive portion of the input device 120 may be integrated with the display device 125, for instance as a touchscreen or similar touch-sensitive display. In one example, the user may input a gesture via the touch-sensitive input panel. As another example, the user may input text via software keyboard displayed on a touchscreen and/or may input gestures upon the touchscreen. In another embodiment, the input device 120 may include a camera, imager, or other image-capture device. For example, the user may make a gesture in front of a camera and the input device 120 may capture/record the user-input gesture via the camera component.

As used herein, a gesture (e.g., a user-input gesture) refers to movement by the user for communicating with the electronic device 105. In some embodiments, the gesture may be made with the user's finger, for example on a touch screen or touch-sensitive input panel. In related embodiments, the gesture may be made by a stylus, or electronic pen wielded by the user. In other embodiments, the gesture may be made with the user's hands and or face, for example a camera may capture gestures made by the user's hands/face.

The user-input gesture may be a command gesture, such a navigation command (e.g., a scroll or page turn command gesture) or a cursor command (e.g., a pointing gesture or selection (tap) gesture), an editing gesture, such as a deletion (e.g., strikethrough) gesture, or the like. Examples of gestures include, but are not limited to, a tap, a double tap, a swipe, a gesture signifying pressing of an "enter" key, a gesture signifying pressing of a "tab" key, a gesture signifying pressing of a "space" key, a strikethrough gesture, and a backspace/delete gesture. Upon the input device 120 receiving the gesture, the gesture module 130 may recognize/identify the gesture. As it may be difficult to differentiate between gestures made over small areas and/or gestures that are similar to each other, the gesture module 130 may detect and resolve ambiguous gesture, as discussed in further detail below.

The display device 125, in one embodiment, may comprise any known electronic display capable of outputting visual data to a user. As used herein, the display device 125 refers to a physical, electronic display component of the electronic device 105. For example, the display device 125 may be an LCD display, an LED display, an OLED display, a projector, or similar display device capable of outputting images, text, characters, and the like to a user. The display device 125 may displays a user interface, such as a graphical user interface (GUI). In one embodiment, the user interface may include one or more windows. For example, the gesture module may generate a window including a magnified ambiguous gesture. As used herein, a screen refers to the content presented on the display device 125, such as a GUI, a window or other graphical control element of the GUI, and the like.

In some embodiments, the display device 125 may be integrated with at least a portion of the input device 120. For example, the display device 125 and a touch panel of the input device 120 may be combined to form a touchscreen or similar touch-sensitive display. The display device 125 may receive data for display from the processor 110, the memory 115, and/or the gesture module 130.

The gesture module 130, in one embodiment, is configured to detect and resolve ambiguous gestures by determining whether a user-input gesture is an ambiguous gesture, presenting a set of candidate gestures corresponding to the user-input gesture, and resolve ambiguous gesture based on user input, as described in further detail below. In some embodiments, the gesture module 130 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

Figure 2:
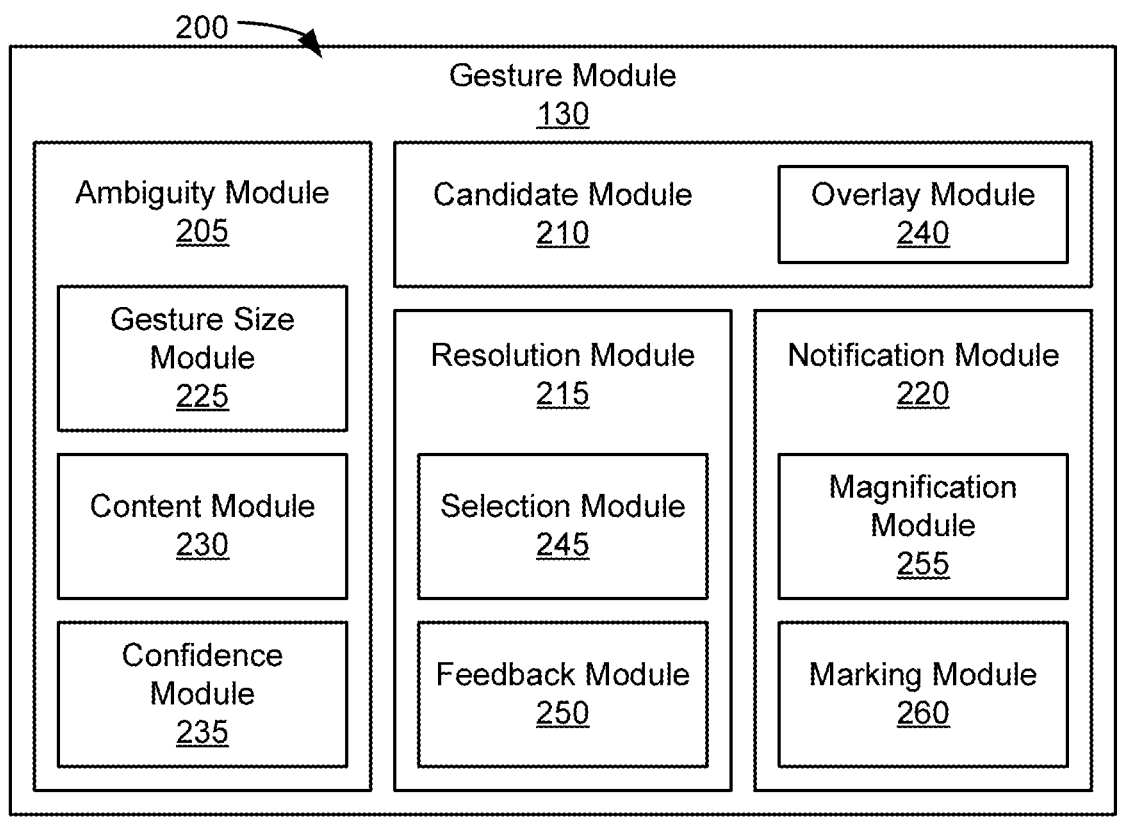
FIG. 2 is a schematic block diagram illustrating one embodiment of an apparatus for gesture ambiguity detection and resolution.

FIG. 2 is a schematic block diagram illustrating an apparatus 200 for gesture ambiguity detection and resolution. The apparatus 200 includes a gesture module 130. In some embodiments, the gesture module 130 is substantially similar to the gesture module 130 described above with reference to FIG. 1. In one embodiment, the gesture module 130 includes an ambiguity module 205, a candidate module 210, and a resolution module 215. As depicted, the gesture module 130 may also include one or more of: a notification module 220, a gesture size module 225, a content size module 230, a confidence module 235, an overlay module 240, a selection module 245, a feedback module 250, a magnification module 255, and a marking module 260. The modules 205-260 may be communicatively coupled to one another.

The ambiguity module 205, in one embodiment, determines whether a user-input gesture is an ambiguous gesture. In some embodiments, the ambiguity module 205 determines whether user-input gesture is ambiguous based on the size of the user-input gesture and/or of content associated with the user-input gesture. For example, if the size of the user-input gesture and/or the associated content is below a threshold size, then the ambiguity module 205 may determine that the user-input gesture is an ambiguous gesture. In certain embodiments, the ambiguity module 205 determines whether you the user-input gesture is ambiguous based on a recognition confidence level for the user-input gesture. For example, if the recognition confidence level is within a "gray area" and/or if multiple gestures are recognized to similar confidence levels, then the ambiguity module 205 may determine that the user-input gesture is an ambiguous gesture.

In certain embodiments, the ambiguity module 205 may include one or more submodules performing specific functions related to determining whether a user-input gesture is an ambiguous gesture. As depicted, the ambiguity module 205 may include one or more of a gesture size module 225, a content module 230, and a confidence module 235. In further embodiments, the ambiguity module 205 may receive inputs from one or more of a gesture size module 225, a content module 230, and a confidence module 235, wherein the ambiguity module 205 determines whether a user-input gesture is an ambiguous gesture based on the received inputs. The ambiguity module 205 may comprise hardware circuits, program code operating on a processing device, or a combination of hardware circuitry and program code.

The candidate module 210, in one embodiment, presents a set of candidate gestures corresponding to the user-input gesture, in response to the user-input gesture being an ambiguous gesture. In some embodiments, the candidate module 210 identifies one or more candidate gestures based on the user-input gesture. In one embodiment, the candidate module 210 may access a library of supported gestures, for example stored in the memory 115, in order to identify the one or more candidate gestures.

In certain embodiments, the candidate module 210 presents a limited number of candidate gestures based on the input gesture. In one embodiment, the number of gestures may be limited to a default and/or user defined number of gestures, such as three, four, or five. In another embodiment, the number of gestures may be based on an area for presenting the candidate gestures, such as display size, screen size, window size, and the like. The limited number of gestures may be selected from the most likely gestures (e.g., best matching the input gesture), most popular gestures, and the like.

In certain embodiments, the candidate module 210 displays the candidate gestures adjacent to the ambiguous gesture (e.g., surrounding the ambiguous gesture). In a further embodiment, the candidate module 210 overlays the candidate gestures presents the candidate gestures by overlaying the candidate gestures a top content surrounding the ambiguous gesture. In some embodiments, the candidate module 210 may present the candidate gestures within a magnified window containing the ambiguous gesture and/or content associated with (e.g., surrounding) the ambiguous gesture. The candidate module 210 may comprise hardware circuits, program code operating on a processing device, or a combination of hardware circuitry and program code.

The resolution module 215, in one embodiment, resolves the ambiguous gesture based on user input. In some embodiments, the resolution module 215 receives a user selection of a candidate gesture from the presented set of candidate gestures. Resolving the ambiguous gesture based on user-input may further include performing an action based on the selected gesture. In other embodiments, the resolution module 215 receives a new user-input gesture. For example, the user may re-enter the gesture (e.g., within a magnified window containing the ambiguous gesture and related content) to resolve the ambiguous gesture. In certain embodiments, the resolution module 215 may update a gesture recognition algorithm, for example, based on a user selection, on user feedback, and/or on a re-entered gesture. The resolution module 215 may comprise hardware circuits, program code operating on a processing device, or a combination of hardware circuitry and program code.

The notification module 220, in one embodiment, notifies the user of the ambiguous gesture. In some embodiments, the notification module 220 notifies the user of the ambiguous gesture by generating a magnification window, the magnification window including the ambiguous gesture and content surrounding the ambiguous gesture. In other embodiments, the notification module 220 may notify the user of the ambiguous gesture by marking the ambiguous gesture, such as by highlighting, coloring, or otherwise visually marking the ambiguous gesture. In further embodiments, the notification module 220 may notify the user of the ambiguous gesture by both generating a magnification window that includes the ambiguous gesture and marking the ambiguous gesture.

In certain embodiments, the notification module 220 may display a pop-up window notifying the user of the ambiguous gesture. In certain embodiments, the pop-up window may be a magnification window that includes the ambiguous gesture and content surrounding the ambiguous gesture. In other embodiments, the pop-up window may be a notification window containing a notification or alert for the user. The notification module 220 may comprise hardware circuits, program code operating on a processing device, or a combination of hardware circuitry and program code.

The gesture size module 225, in one embodiment, measures a size of the user-input gesture. In certain embodiments, the gesture size module 225 may identify additional properties of the user-input gesture, such as gesture speed, gesture duration, gesture location, and the like. The properties measured by the gesture size module 225 may be used by the ambiguity module 205 to determine whether the user-input gesture is an ambiguous gesture.

In certain embodiments, the measured gesture size may be a measured length (e.g., a distance or linear size) of the user-input gesture. In other embodiments, the measured gesture size may be an area of the user-input gesture (e.g., an area encompassing the user-input gesture). The gesture length/area may be measured by the number of pixels corresponding to the gesture or by physical distance on the display device 125 corresponding to the gesture.

In one embodiment, the gesture size module 225 may provide the size of the user-input gesture to the ambiguity module 205, wherein the ambiguity module 205 may compare the size of the user-input gesture to a threshold gesture size. In another embodiment, the gesture size module 225 may compare the size of the user-input gesture to a threshold gesture size and indicate the comparison result to the ambiguity module 205. In certain embodiments, the threshold gesture size is different for each supported gesture. In other embodiments, the threshold gesture size may be universal across all supported gestures.

In some embodiments, the ambiguity module 205 may determine the user-input gesture to be an ambiguous gesture in response to the size of the user-input gesture being below a threshold gesture size. In other embodiments, the ambiguity module 205 may analyze additional factors (e.g., content size and/or confidence level) in response to the size of the user-input gesture being below a threshold gesture size, wherein the ambiguity module 205 determines whether the user-input gesture is an ambiguous gesture based on the plurality of factors. Conversely, if the size of the user-input gesture exceeds the threshold level, then the ambiguity module 205 may determine the user-input gesture to be unambiguous and/or may analyze additional factors (e.g., content size and/or confidence level) before determining the user-input gesture to be an unambiguous gesture.

The gesture size module 225 may comprise hardware circuits, program code operating on a processing device, or a combination of hardware circuitry and program code. As depicted, the gesture size module 225 may be a component of the ambiguity module 205. For example, the gesture size module 225 may be a hardware component of the ambiguity module 205. As another example, the gesture size module 225 may be a subroutine of the ambiguity module 205. However, in other embodiments the gesture size module 225 may be an independent component communicatively coupled to the ambiguity module 205.

The content module 230, in one embodiment, identifies content associated with the user gesture. In some embodiments, the content module 230 may identify an on-screen location corresponding to the user-input gesture. The content may be a word, a phrase, a sentence, an icon, an image, an object, or the like presented within a window (e.g., of a GUI presented on the display device 125). As used herein, the on-screen location refers to a location within a screen, window, or other GUI that corresponds to a physical location on the input device 120 where the gesture was entered by the user. The content module 230 may then identify content displayed at or near the on-screen location.

The content module 230 may further identify a size of the associated content. In some embodiments, the content size may be a distance (e.g., a length or linear size). In other embodiments, the content size may be an area (e.g., an area encompassing the content). The content size may be measured by a number of pixels corresponding to the content or by physical dimension on the display device 125 corresponding to the content.

In one embodiment, the content size module 230 may provide the size of content associated with the user-input gesture to the ambiguity module 205, wherein the ambiguity module 205 may compare the size of the associated content to a threshold content size. In another embodiment, the content size module 230 may compare the size of associated content to a threshold content size and indicate the comparison result to the ambiguity module 205.

In certain embodiments, the ambiguity module 205 may determine the user-input gesture to be an ambiguous gesture in response to the size of the associated content being below a threshold content size. In other embodiments, the ambiguity module 205 may analyze additional factors (e.g., gesture size and/or confidence level) in response to the size of the associated content being below a threshold content size, wherein the ambiguity module 205 determines whether the user-input gesture is an ambiguous gesture based on the plurality of factors. Conversely, if the size of the associated content exceeds the threshold level, then the ambiguity module 205 may determine the user-input gesture to be unambiguous and/or may analyze additional factors (e.g., gesture size and/or confidence level) before determining the user-input gesture to be an unambiguous gesture.

The content module 220 may comprise hardware circuits, program code operating on a processing device, or a combination of hardware circuitry and program code. As depicted, the content module 220 may be a component of the ambiguity module 205. For example, the content module 220 may be a hardware component of the ambiguity module 205. As another example, the content module 220 may be a subroutine of the ambiguity module 205. However, in other embodiments the content module 220 may be an independent component communicatively coupled to the ambiguity module 205.

The confidence module 235, in one embodiment, determines a recognition confidence level for the user-input gesture. In some embodiments, the confidence module 235 calculates the confidence level by receiving one or more candidate gestures for the user-input gesture (e.g., from the candidate module 210) and comparing the user-input gesture to each candidate gestures. The confidence module 235 may then calculate a degree to which the user-input gesture matches each candidate gesture. In certain embodiments, the confidence level is based a likelihood that the user-input gesture is a match for only one of the candidate gestures. In further embodiments, the confidence level may be based on a plurality of factors including the likelihood that the user-input gesture is a match for only one of the candidate gestures.

In one embodiment, the user-input gesture may be an ambiguous gesture in response to the recognition confidence level being within a "gray area," that is within a range of values indicative of an indeterminate result. For example, if there is neither a strong likelihood that the input gesture matches a candidate gesture nor a strong likelihood that the input gesture does not match the candidate gesture, then the recognition confidence level may be with within the "gray area." As another example, if the recognition confidence level is less than 65% more than 35%, then the user-input gesture may be unambiguous gesture due to the confidence level being within the gray area (in this example, a range between 35% and 65%). In another embodiment, the user-input gesture may be an ambiguous gesture in response to multiple gestures being recognized to a similar recognition confidence level.

As an example, the candidate module 210 may identify three candidate gestures for a user-input gesture, wherein the confidence module 235 determines that the first candidate gesture is an 80% match for the user-input gesture, the second candidate gesture is a 50% match for the user-input gesture, and the third candidate gesture is a 40% match for the user-input gesture. In this example, there may be a high likelihood that the user-input gesture is a match for only one candidate gesture (e.g., for the first candidate gesture) due to the difference between the degrees to which the user-input gesture matches each candidate gesture (e.g., 80% versus 50% and 40%). Accordingly, the confidence module 235 may determine a high confidence level for this user-input gesture.

As another example, the difference between the degrees to which the user-input gesture matches each candidate gesture may be small, thereby resulting in a low confidence level. Assume that the candidate module 210 again identifies three candidate gestures for a user-input gesture. Further assume the confidence module 235 compares the user inputted gesture to the candidate gestures and calculates that the first candidate gesture is a 80% match, the second candidate gesture is a 75% match, and the third candidate gesture is a 50% match. In this example, there is a small difference between the degree to which the user-input gesture matches the first gesture and the second gesture (e.g., 80% versus 75%). Accordingly, the confidence module 235 may determine a low confidence level for this user-input gesture due to the small difference between the degrees to which the user-input gesture matches each candidate gesture. Thus, ambiguity may exist even though there is a good likelihood that the user-input gesture matches a candidate gesture (e.g., 80% match for the first candidate gesture and 75% match for the second candidate gesture).

In some embodiments, the confidence module 235 may provide the confidence level to the ambiguity module 205, wherein the ambiguity module 205 may compare the recognition confidence level to a confidence level threshold. In other embodiments, the confidence module 235 may compare the recognition confidence level to a threshold level and indicate the comparison result to the ambiguity module 205.

In one embodiment, the ambiguity module 205 may determine the user-input gesture to be an ambiguous gesture in response to the recognition confidence level being below a threshold level. In another embodiment, the ambiguity module 205 may analyze additional factors (e.g., gesture size and/or content size) in response to the recognition confidence level being below a threshold level, wherein the ambiguity module 205 determines whether the user-input gesture is an ambiguous gesture based on the plurality of factors. Conversely, if the confidence level exceeds the threshold level, then the ambiguity module 205 may determine the user-input gesture to be unambiguous and/or may analyze additional factors (e.g., gesture size and/or content size) before determining the user-input gesture to be an unambiguous gesture.

The confidence module 235 may comprise hardware circuits, program code operating on a processing device, or a combination of hardware circuitry and program code. As depicted, the confidence module 235 may be a component of the ambiguity module 205. For example, the confidence module 235 may be a hardware component of the ambiguity module 205. As another example, the confidence module 235 may be a subroutine of the ambiguity module 205. However, in other embodiments the confidence module 235 may be an independent component communicatively coupled to the ambiguity module 205.

The overlay module 240, in one embodiment, is configured to overlay the set of candidate gestures on content associated with the user-input gesture. For example, the overlay module 240 may superimpose the set of candidate gestures atop the content associated with the ambiguous user-input gesture. In certain embodiments, the overlay module 240 centers the set of candidate gestures on the ambiguous user-input gesture.

The overlay module 240 may comprise hardware circuits, program code operating on a processing device, or a combination of hardware circuitry and program code. As depicted, the overlay module 240 may be a component of the candidate module 210. For example, the overlay module 240 may be a hardware component of the candidate module 210. As another example, the overlay module 240 may be a subroutine of the candidate module 210. However, in other embodiments the overlay module 240 may be an independent component communicatively coupled to the candidate module 210.

The selection module 245, in one embodiment, receives a user selection of a candidate gesture. For example, the user may touch a location on a touchscreen device corresponding to one of the candidate gestures, wherein the selection module 245 identifies the candidate gesture at the touched location, thus receiving the user selection. In some embodiments, the selection module 245 provides the user selection to the resolution module 215, wherein the resolution module 215 performs an action corresponding to the selected candidate gesture.

The selection module 245 may comprise hardware circuits, program code operating on a processing device, or a combination of hardware circuitry and program code. As depicted, the selection module 245 may be a component of the resolution module 215. For example, the selection module 245 may be a hardware component of the resolution module 215. As another example, the selection module 245 may be a subroutine of the resolution module 215. However, in other embodiments the selection module 245 may be an independent component communicatively coupled to the resolution module 215.

The feedback module 250, in one embodiment, identifies user feedback and uses the user feedback to update a gesture recognition algorithm. In some embodiments, the user may expressly provide feedback, such as via a feedback prompt and/or feedback menu, wherein the feedback module 250 may update the gesture recognition algorithm based on the express feedback. In other embodiments, the user may implicitly provide feedback, such as reentering an ambiguous gesture, wherein the feedback module 250 may update the gesture recognition algorithm based on the implicit feedback.

For example, in response to the candidate module 210 presenting a set of candidate gestures within a magnification window (e.g., generated by the notification module 220), rather than select a candidate gesture, the user may instead reenter the ambiguous gesture within the magnification window. The gesture module 130 may recognize the reentered user-input gesture, and the feedback module 250 may use the reentered user-input gesture to update the gesture recognition algorithm.

The feedback module 250 may comprise hardware circuits, program code operating on a processing device, or a combination of hardware circuitry and program code. As depicted, the feedback module 250 may be a component of the resolution module 215. For example, the feedback module 250 may be a hardware component of the resolution module 215. As another example, the feedback module 250 may be a subroutine of the resolution module 215. However, in other embodiments the feedback module 250 may be an independent component communicatively coupled to the resolution module 215.

The magnification module 255, in one embodiment, creates magnification window which magnifies an area encompassing the ambiguous gesture. In some embodiments, the magnification module 255 also magnifies an area encompassing the content associated with the ambiguous gesture. For example, the magnification module 255 may generate a magnification window which includes both the ambiguous gesture and content associated with the ambiguous gesture. In certain embodiments, the candidate module 210 presents set of candidate gestures within the magnification module. The magnification module 255 may further remove the magnified area (e.g., remove the magnification window) in response to the user selecting a candidate gesture and/or entering a new gesture.

In one embodiment, the magnification module 255 selects an amount magnification for the area (e.g., magnification window). The magnification module 255 may select the amount magnification based on a size of the user-input gesture and/or a size of content associated with the user-input gesture. In certain embodiments, the amount of magnification may be based on the larger of the ambiguous user-input gesture and the associated content.

In some embodiments, the magnification amount may be further based on a size of the area (e.g., a size of the magnification window). For example, the magnification module 255 may select a level of magnification such that the ambiguous gesture fills the magnification window. As another example, the magnification module 255 may select a level of magnification such that the content associated with the ambiguous gesture fills the magnification window.

The magnification module 255 may comprise hardware circuits, program code operating on a processing device, or a combination of hardware circuitry and program code. As depicted, the magnification module 255 may be a component of the notification module 220. For example, the magnification module 255 may be a hardware component of the notification module 220. As another example, the magnification module 255 may be a subroutine of the notification module 220. However, in other embodiments the magnification module 255 may be an independent component communicatively coupled to the notification module 220.

The marking module 260, in one embodiment, is configured to mark the ambiguous gesture. For example, the marking module 260 may highlight, color, select, underline, or otherwise visually mark the ambiguous user-input gesture. The foregoing examples intended to be illustrative, and not limiting. Accordingly, one skilled in the art will recognize that the marking module 260 may mark the ambiguous gesture using any known marking technique.

The marking module 260 may comprise hardware circuits, program code operating on a processing device, or a combination of hardware circuitry and program code. As depicted, the marking module 260 may be a component of the notification module 220. For example, the marking module 260 may be a hardware component of the notification module 220. As another example, the marking module 260 may be a subroutine of the notification module 220. However, in other embodiments the marking module 260 may be an independent component communicatively coupled to the notification module 220.

Figure 3A:
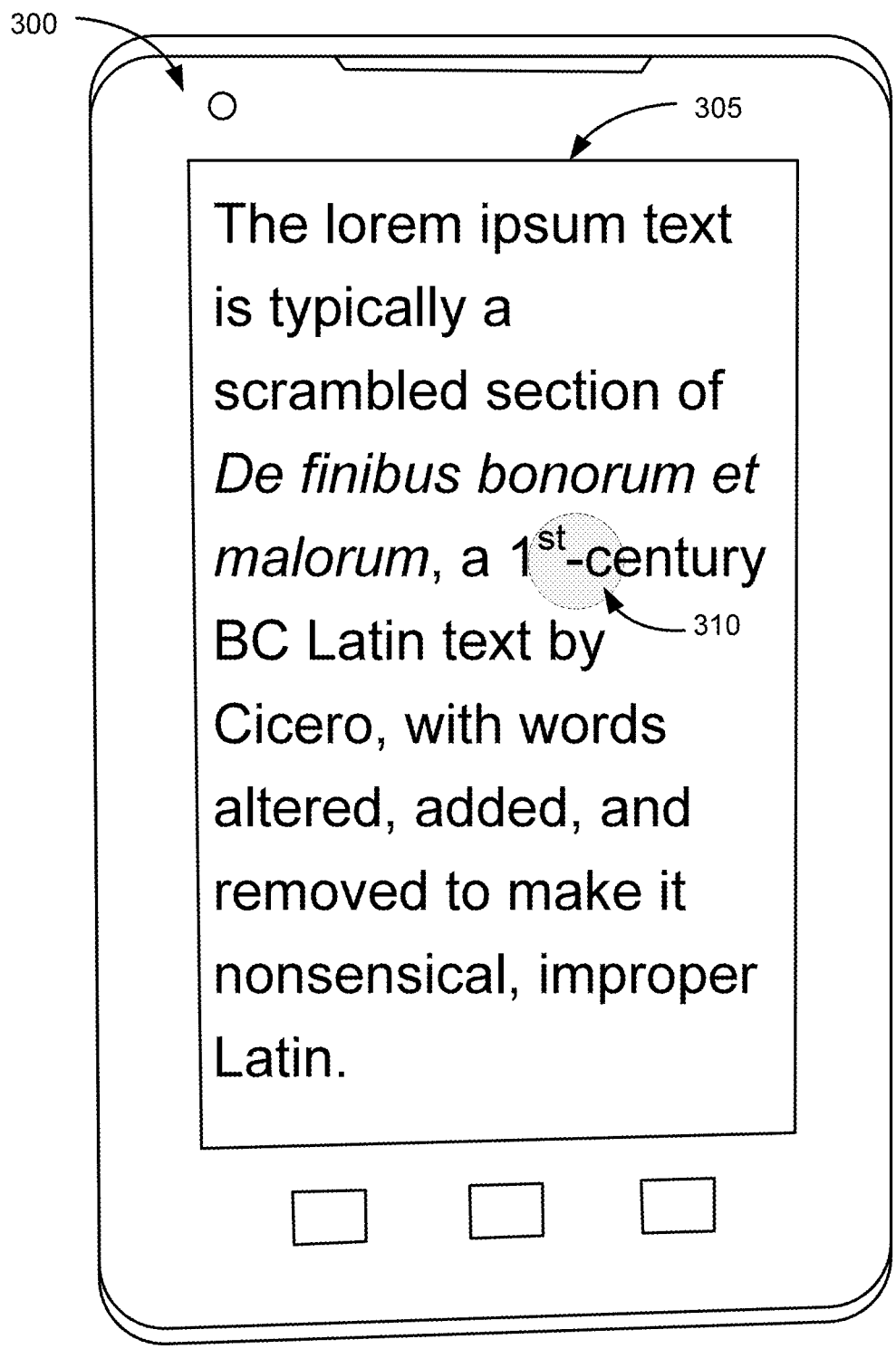
FIG. 3A is a schematic block diagram illustrating one embodiment of a mobile device for gesture ambiguity detection and resolution.
Figure 3B:
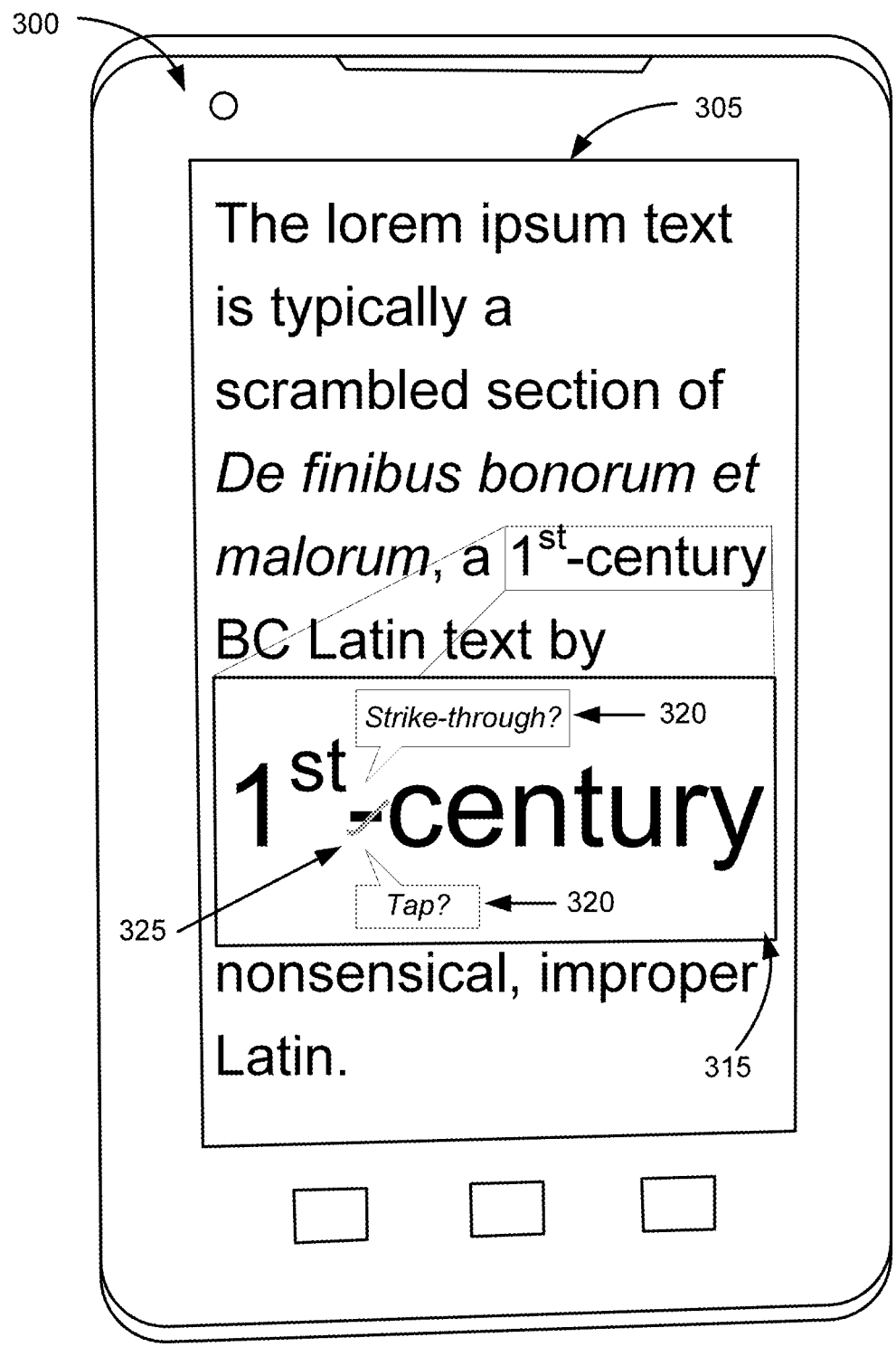
FIG. 3B is a schematic block diagram illustrating another embodiment of the mobile device of FIG. 3A.
Figure 3C:
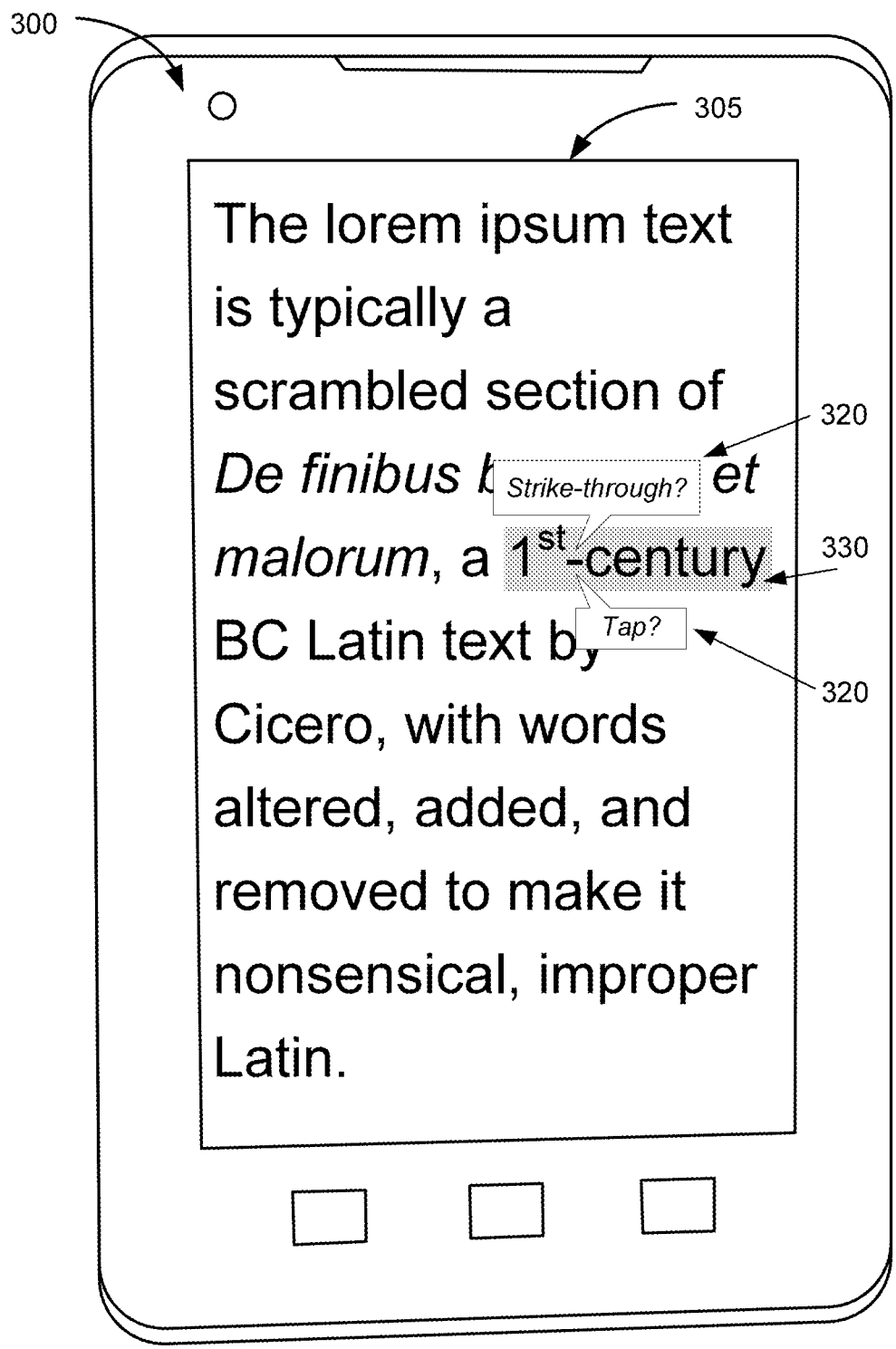
FIG. 3C is a schematic block diagram illustrating another embodiment of the mobile device of FIG. 3A.

FIG. 3A-3C are schematic block diagrams illustrating a mobile device 300 for gesture ambiguity detection and resolution, according to embodiments of the disclosure. The mobile device 300 may be one embodiment of the electronic device 105. Accordingly, in some embodiments the mobile device 300 may include a gesture module 130 that receives the user-input gesture, determines whether the user-input gesture is an ambiguous gesture, presents a set of candidate gestures in response to the user-input gesture being an ambiguous gesture, and resolve the ambiguous gesture based on further user input.

As in FIG. 3A, the mobile device 300 includes a touchscreen display 305. Here, the user inputs a gesture at the location 310 using the touchscreen display 305. The touchscreen display 305 shows a user interface, such as a window containing text. In other embodiments, the touchscreen display 305 may show other user interfaces.

In response to receiving the user-input gesture, the mobile device 300 determines whether the input gesture is an ambiguous gesture. In certain embodiments, the mobile device 300 measures a size of the user-input gesture and compares the measured size to a threshold size in order to determine whether the input gesture is an ambiguous gesture. In further embodiments, the mobile device 300 may determine whether the input gesture is an ambiguous gesture compare additional properties of the user-input gesture (such as gesture location, gesture speed, gesture duration, and the like) to additional thresholds.

In some embodiments, the mobile device 300 identifies content associated with the user-input gesture. Here, the mobile device 300 may identify the term "$1^{st}$-century" as the content associated with the user-input gesture based on the location 310 of the user-input gesture. The mobile device 300 may determine whether the user-input gesture is an ambiguous gesture based on the size of the content, or other properties of the content. For example, the mobile device 300 may determine that the input gesture is ambiguous in response to the content size being below a threshold size.

In some embodiments, the mobile device 300 may determine whether the user-input gesture is ambiguous based on a confidence level, for example, generated by a gesture recognition algorithm and/or a confidence module 235. The mobile device 300 may determine that the user-input gesture is an ambiguous gesture if the confidence level is in a "gray area" or if multiple gestures have a similar confidence level, as discussed above.

FIG. 3B depicts one embodiment of the mobile device 300 after determining that the user-input gesture is an ambiguous gesture. Here, the mobile device 300 notifies the user of the ambiguous gesture by generating a magnification window 315 containing the ambiguous gesture 325 and the content associated with the ambiguous gesture 325 (e.g., the term "$1^{st}$-century"). The mobile device 300 also presents a set of candidate gestures 320, the candidate gestures 320 based on the user-input gesture. Here, the mobile device 300 identifies two candidate gestures 320 ("strike-through" and "tap") as possible interpretations of the ambiguous gesture 325.

In response to presenting the set of candidate gestures 320, the mobile device 300 may wait for further user input in order to resolve the ambiguous gesture 325. In one embodiment, the user may select one of the candidate gestures 320. In another embodiment, the user may re-enter ambiguous gesture 325. In some embodiments, the mobile device 300 may determine the re-entered user gesture to also be an ambiguous gesture, wherein the mobile device 300 may notify the user that the input gesture is not recognized and may not be supported. Otherwise, responsive to receiving the additional user input, the mobile device 300 may perform an action corresponding to either the selected candidate gesture or the re-entered user-input gesture.

FIG. 3C depicts an alternative embodiment of the mobile device 300 after determining that the user-input gesture is an ambiguous gesture. Here, the mobile device 300 notifies the user of the ambiguous gesture by marking 330 the ambiguous gesture and/or the content associated with the ambiguous gesture (here, the term "$1^{st}$-century"). Marking 330 the ambiguous gesture and/or the associated content may include highlighting, coloring, or otherwise visually indicating the area containing the ambiguous gesture and/or the associated content.

Additionally, the mobile device 300 overlays a set of candidate gestures 320 on the content associated with the ambiguous gesture. As shown, the candidate gestures 320 "strikethrough" and "tap" are displayed near the ambiguous gesture and overlaying the text on the touchscreen display 305. As discussed above, with reference to FIG. 3B, the mobile device 300 may wait for further user input in order to resolve the ambiguous gesture. In response to receiving the additional user input, the mobile device 300 may perform an action corresponding to either a selected candidate gesture or a reentered user-input gesture. In some embodiments, the mobile device 300 may also update a gesture recognition algorithm in response to receiving the additional user input.

Figure 4:
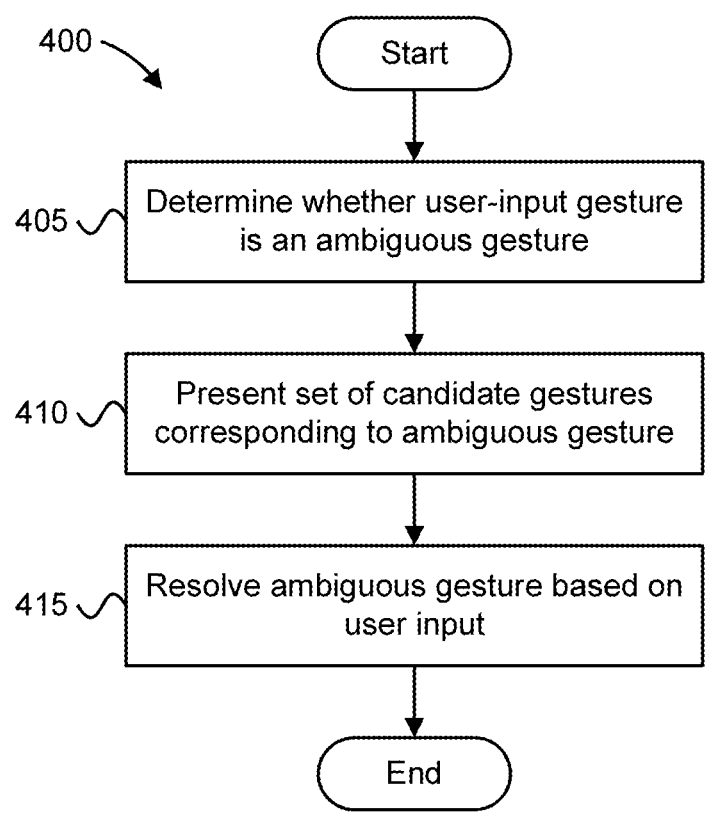
FIG. 4 is a schematic flow chart diagram illustrating one embodiment of a method for gesture ambiguity detection and resolution.

FIG. 4 is a schematic flow chart diagram illustrating a method 400 for gesture ambiguity detection and resolution, according to embodiments of the disclosure. In one embodiment, the method 400 is performed by the electronic device 105. In another embodiment, the method 400 may be performed by the apparatus 200. Alternatively, the method 400 may be performed by a processor 110 and a computer readable storage medium, such as the memory 115. The computer readable storage medium may store code that is executed on the processor 110 to perform the functions of the method 400.

The method 400 begins and determines 405 whether a user-input gesture is an ambiguous gesture. In one embodiment, the ambiguity module 205 determines 405 whether a user-input gesture is an ambiguous gesture. In some embodiments, determining 405 whether a user-input gesture is an ambiguous gesture may be based on the size of the input gesture, the size of content near the input gesture, a confidence level of the input gesture, and/or the like. In certain embodiments, determining 405 whether the user-input gesture is an ambiguous gesture may include an evaluation of multiple factors, including two or more of: the size of the input gesture, the size of content near the input gesture, and a confidence level of the input gesture.

The method 400 presents 410 a set of candidate gestures corresponding to the user-input gesture, in response to the user-input gesture being an ambiguous gesture. In one embodiment, the candidate module 210 presents 410 a set of candidate gestures corresponding to the user-input gesture via the display device 125, in response to the ambiguity module 205 determining 405 a user-input gesture to be an ambiguous gesture. In some embodiments, presenting 410 a set of candidate gestures corresponding to the user-input gesture includes identifying a set of candidate gestures from a plurality of recognized user-input gestures (e.g., from a library of supported user-input gestures).

In certain embodiments, presenting 410 a set of candidate gestures corresponding to the user-input gesture includes presenting a limited number of candidate gestures based on the input gesture. In one embodiment, the number of gestures may be limited to a default and/or user defined number of gestures, such as three, four, or five. In another embodiment, the number of gestures may be based on an area for presenting the candidate gestures, such as display size, screen size, window size, and the like. The limited number of gestures may be selected from the most likely gestures (e.g., best matching the input gesture), most popular gestures, and the like.

In some embodiments, presenting 410 a set of candidate gestures corresponding to the user-input gesture may include presenting the candidate gestures within a magnified window containing the ambiguous gesture and/or content associated with (e.g., surrounding) the ambiguous gesture. For example, the notification module 220 may generate a magnified window overlaying the ambiguous gesture, wherein the magnified window includes the ambiguous gesture and content near the ambiguous gesture. The candidate module 210 may present the candidate gestures within the magnified window. In certain embodiments, presenting 410 a set of candidate gestures corresponding to the user-input gesture may include presenting the candidate gestures adjacent to the ambiguous gesture (e.g., surrounding the ambiguous gesture). In further embodiments, presenting 410 a set of candidate gestures corresponding to the user-input gesture may include overlaying the set of ambiguous gestures on content associated with the user gesture.

The method 400 resolves 415 the ambiguous gesture based on user-input and the method 400 ends. In one embodiment, the resolution module 215 resolves 415 the ambiguous gesture based on user input. In some embodiments, resolving 415 the ambiguous gesture may include receiving a user selection of a candidate gesture from the presented set of candidate gestures. Resolving 415 the ambiguous gesture based on user-input may further include performing an action based on the selected gesture. In other embodiments, resolving 415 the ambiguous gesture may include receiving a new user-input gesture. For example, the user may re-enter the gesture (e.g., within a magnified window containing the ambiguous gesture and related content) to resolve the ambiguous gesture. In certain embodiments, resolving 415 the ambiguous gesture may include updating a gesture recognition algorithm, for example, based on a user selection, on user feedback, and/or on a re-entered gesture.

Figure 5:
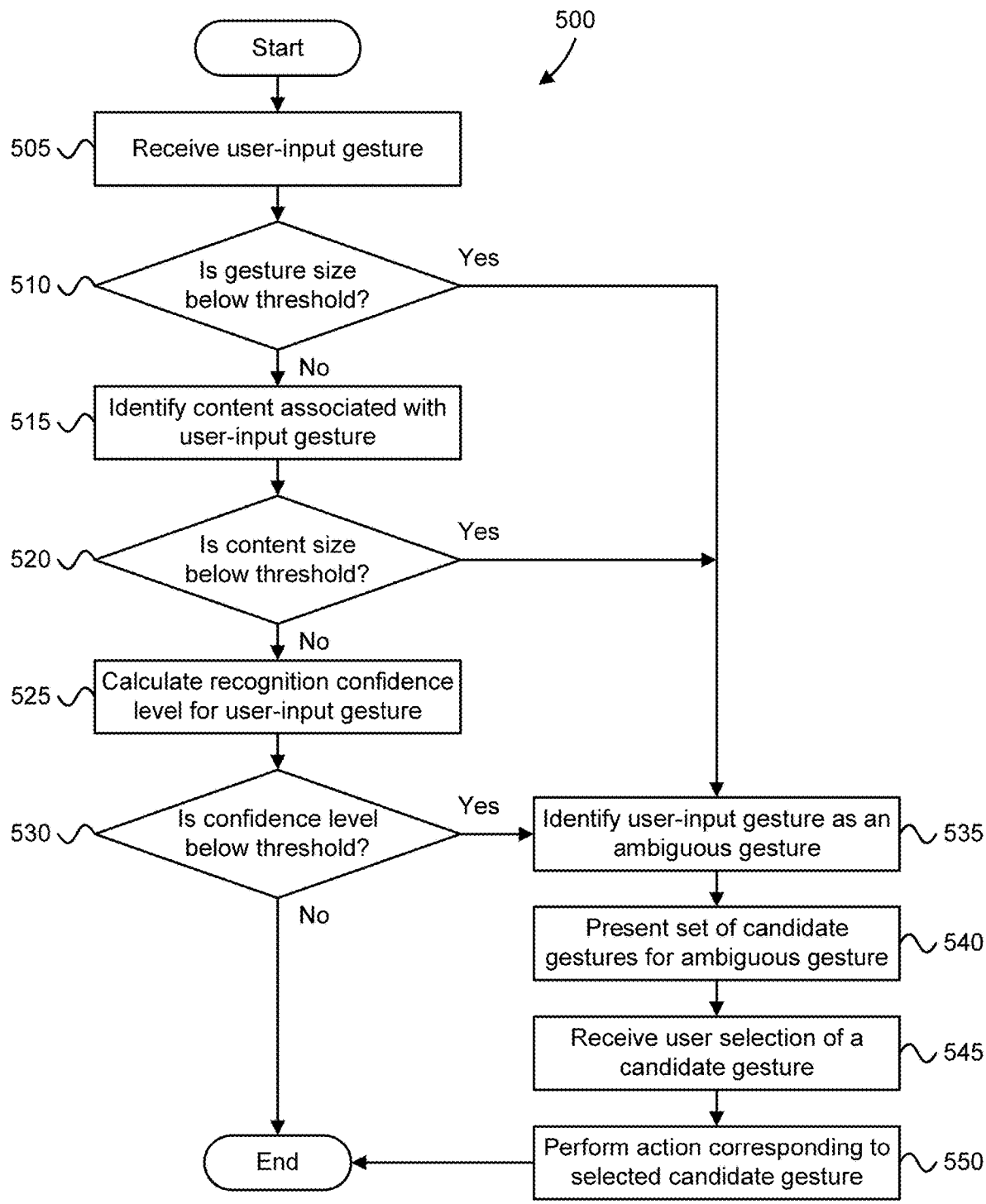
FIG. 5 is a schematic flow chart diagram illustrating another embodiment of a method for gesture ambiguity detection and resolution.

FIG. 5 is a schematic flow chart diagram illustrating a method 500 for gesture ambiguity detection and resolution, according to embodiments of the disclosure. In one embodiment, the method 500 is performed by the electronic device 105. In another embodiment, the method 500 may be performed by the apparatus 200. Alternatively, the method 500 may be performed by a processor 110 and a computer readable storage medium, such as the memory 115. The computer readable storage medium may store code that is executed on the processor 110 to perform the functions of the method 500.

The method 500 begins and receives 505 the user-input gesture. In one embodiment, the gesture module 130 receives the user-input gesture via the input device 120. For example, a user may input a gesture a touchscreen (e.g., of the input device 120) using a finger, a stylus, an electronic pen, or similar input mechanism. As another example, the user may input gesture via a camera, imager, or other image capture device. In some embodiments, receiving 505 the user-input gesture includes identifying properties of the user-input gesture, such as gesture size, gesture speed, gesture duration, gesture location, and the like.

The method 500 then determines 510 whether a size of the user-input gesture is below a threshold size. In one embodiment, the ambiguity module 205 and/or the gesture size module 225 determines 510 whether the size of the user-input gesture is below a threshold gesture size. In some embodiments, determining 510 whether the size of the user-input gesture is below a threshold size includes measuring a size of the user-input gesture and comparing the user-input gesture size to the threshold gesture size. In certain embodiments, the gesture size may be a length (e.g., a distance or linear size). In other embodiments, the gesture size may be an area (e.g., an area encompassing the gesture).

In response to determining 510 that the size of the user-input gesture is below a threshold size, the method 500 identifies 535 the user-input gesture as an ambiguous gesture. Otherwise, in response to determining 510 that the size of the user-input gesture is not below the threshold size, the method 500 identifies 515 content associated with the user-input gesture.

In one embodiment, the content size module 230 identifies 515 content associated with the user-input gesture. In some embodiments, identifying 515 content associated with the user-input gesture includes identifying an on-screen location corresponding to the user-input gesture and identifying content near the on-screen location. The content may be a word, a phrase, a sentence, an icon, an image, an object, or the like presented within a window (e.g., of a GUI presented on the display device 125). In certain embodiments, identifying 515 content associated with the user-input gesture includes identifying properties of the associated content, such as content size, content location, and the like.

The method 500 then determines 520 whether a size of the associated content is below a threshold size. In one embodiment, the ambiguity module 205 and/or the content size module 230 determines 520 whether the size of the associated content is below a threshold content size. In some embodiments, determining 520 whether the associated content is below a threshold content size includes identifying a size of the associated content and comparing the identified size to the threshold content size. In some embodiments, the content size may be a distance (e.g., a length or linear size). In other embodiments, the content size may be an area (e.g., an area encompassing the content).

In response to determining 520 that the size of the associated contact is below a threshold size, the method 500 identifies 535 the user-input gesture as an ambiguous gesture. Otherwise, in response to determining 520 that the size of the associated content is not below the threshold size, the method 500 calculates a 525 a confidence value associated with the user-input gesture.

In one embodiment, the confidence module 235 calculates 525 a confidence level associated with the user-input gesture. In some embodiments, calculating 525 the confidence level includes identifying one or more candidate gestures for the user-input gesture, comparing the user-input gesture to each candidate gestures, and calculating a degree to which the user-input gesture matches each candidate gesture. In certain embodiments, the confidence level is a likelihood that the user-input gesture is a match for only one of the candidate gestures. In further embodiments, the confidence level may be based on a plurality of factors.

The method 500 then determines 530 whether the confidence value is below a threshold level. In one embodiment, the ambiguity module 205 and/or the confidence module 235 determines 530 whether the confidence level for the user-input gesture is below a threshold level. In response to determining 530 that the confidence value is below threshold level, the method 500 identifies 535 that the user-input gesture is an ambiguous gesture. In one embodiment, the ambiguity module 205 identifies 535 the user-input gesture as an ambiguous gesture. Otherwise, the user-input gesture is not an ambiguous gesture and the method 500 ends.

In response to identifying 535 the user-input gesture as an ambiguous gesture, the method 500 presents 540 a set of candidate gestures corresponding to the user-input gesture. In one embodiment, the candidate module 210 presents 540 the set of candidate gestures corresponding to the user-input gesture via the display device 125. In some embodiments, presenting 540 the set of candidate gestures includes identifying a set of candidate gestures based on the user-input gesture. For example, the candidate module 210 may compare the user-input gesture to a plurality of candidate gestures and select a set of candidate gestures that most closely match the user-input gesture (e.g., the top three matching candidate gestures).

In certain embodiments, presenting 540 a set of candidate gestures corresponding to the user-input gesture includes presenting a limited number of candidate gestures based on the input gesture. In one embodiment, the number of gestures may be limited to a default and/or user defined number of gestures, such as three, four, or five. In another embodiment, the number of gestures may be based on an area for presenting the candidate gestures, such as display size, screen size, window size, and the like. The limited number of gestures may be selected from the most likely gestures (e.g., best matching the input gesture), most popular gestures, and the like.

In some embodiments, presenting 540 a set of candidate gestures corresponding to the user-input gesture may include presenting the candidate gestures within a magnified window containing the ambiguous gesture and/or content associated with (e.g., surrounding) the ambiguous gesture. For example, the notification module 220 may generate a magnified window overlaying the ambiguous gesture, wherein the magnified window includes the ambiguous gesture and content near the ambiguous gesture. The candidate module 210 may present the candidate gestures within the magnified window. In certain embodiments, presenting 540 a set of candidate gestures corresponding to the user-input gesture may include presenting the candidate gestures adjacent to the ambiguous gesture (e.g., surrounding the ambiguous gesture). In further embodiments, presenting 540 a set of candidate gestures corresponding to the user-input gesture may include overlaying the set of ambiguous gestures on content associated with the user gesture.

In response to presenting 540 the set of candidate gestures, the method 500 receives 545 the user selection of a candidate gesture. In one embodiment, the resolution module 220 and/or the selection module 245 receives 545 the user selection. In some embodiments, receiving 545 the user selection may include receiving, via the input device 120, a touch at (or near) the location of a presented candidate gesture. In other embodiments, the receiving 545 the user selection may include receiving a voice instruction selecting a candidate gesture. In certain embodiments, receiving 545 the user selection may include the user selecting none of the presented candidate gestures. For example, the user may select none of the presented candidate gestures and instead rewrite the ambiguous gesture in the magnified window.

Responsive to receiving 545 the user selection, the method 500 performs 550 an action corresponding to the selected candidate gesture and the method 500 ends. While the method 500 depicts a specific order of determination steps 510, 520, and 530, the steps 510, 520, and 520 may be performed in any order. For example, a method may first calculate a recognition confidence level and determine whether the conference levels below a threshold level, prior to determining whether a gesture size and/or a content size is below is size threshold. Further, the method 500 depicts the determination steps 510, 520, and 530 as being sole factors in identifying 535 the user input gesture as an ambiguous gesture, and alternative embodiments user input gesture may need to satisfy two or more factors (e.g., gesture size, content size, and confidence level) in order to be identified as an ambiguous gesture.

Figure 6:
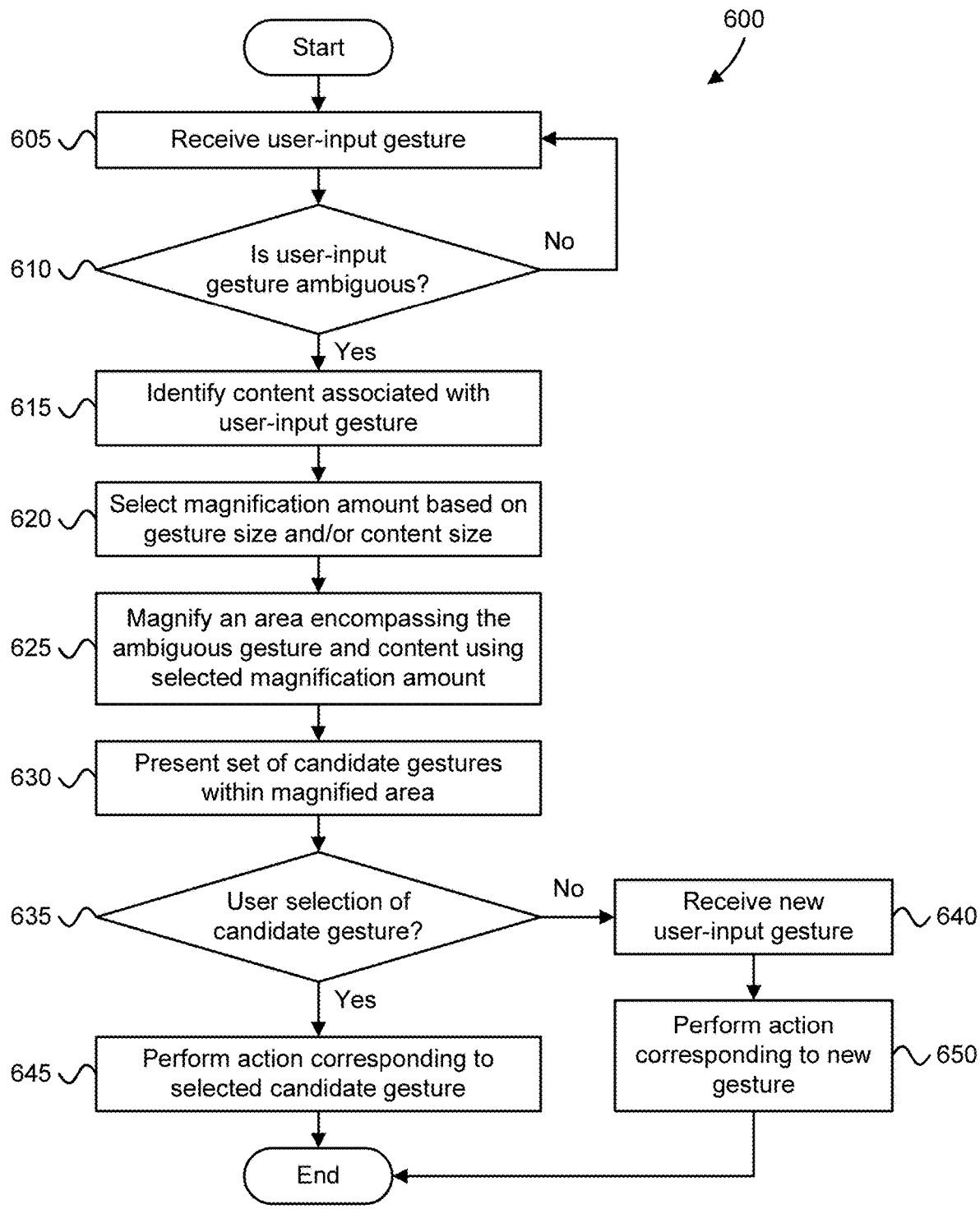
FIG. 6 is a schematic flow chart diagram illustrating another embodiment of a method for gesture ambiguity detection and resolution.

FIG. 6 is a schematic flow chart diagram illustrating a method 600 for gesture ambiguity detection and resolution, according to embodiments of the disclosure. In one embodiment, the method 600 is performed by the electronic device 105. In another embodiment, the method 600 may be performed by the apparatus 200. Alternatively, the method 600 may be performed by a processor 110 and a computer readable storage medium, such as the memory 115. The computer readable storage medium may store code that is executed on the processor 110 to perform the functions of the method 600.

The method 600 begins and receives 605 a user-input gesture. In one embodiment, the gesture module 130 receives the user-input gesture via the input device 120. In some embodiments, the user may input a gesture into a touchscreen of the input device 120 using a finger, a stylus, an electronic pen, or the like. In other embodiments, the user may input a gesture via a camera of the input device 120. In certain embodiments, receiving six or five the user-input gesture includes identifying a property of the user-input gesture, such as a gesture size, a gesture speed, a gesture duration, a gesture location, and the like.

The method 600 determines 610 whether the user-input gesture is an ambiguous gesture. In one embodiment, the ambiguity module 205 determines 610 whether the user-input gesture is an ambiguous gesture. In some embodiments, determining 610 whether the user-input gesture is an ambiguous gesture includes comparing the size of the input gesture, the size of content near the input gesture, a confidence level of the input gesture, or similar criteria to one or more thresholds. In certain embodiments, determining 610 whether the user-input gesture is an ambiguous gesture may include an evaluation of multiple factors, including two or more of: the size of the input gesture, the size of content near the input gesture, and a confidence level of the input gesture.

In response to the user-input gesture being an ambiguous gesture, the method 600 identifies 615 content associated with the user-input gesture. In one embodiment, the content size module 230 identifies 615 content associated with the user-input gesture. In some embodiments, identifying 615 content associated with the user-input gesture includes identifying an on-screen location corresponding to the user-input gesture and identifying content near the on-screen location. The content may be a word, a phrase, a sentence, an icon, an image, an object, or the like presented within a window (e.g., of a GUI presented on the display device 125). In certain embodiments, identifying 615 content associated with the user-input gesture includes identifying properties of the associated content, such as content size, content location, and the like.

The method 600 then selects 620 a magnification amount based on one or more of the size of the ambiguous gesture and the size of content associated with the ambiguous gesture. In one embodiment, the magnification module 255 selects 620 the magnification amount. In some embodiments, the magnification amount may be further based on a size of a magnification window, wherein the magnification window overlays an area of the GUI near the on-screen location of the user gesture. In one embodiment, selecting 620 the magnification amount may include selecting a level of magnification such that the ambiguous gesture fills the magnification window. In another embodiment, selecting 620 the magnification amount may include selecting a level of magnification such that the content associated with the ambiguous gesture fills the magnification window. In certain embodiments, the amount of magnification may be based on the larger of the ambiguous gesture and the associated content.

The method 600 then magnifies 625 an area encompassing the ambiguous gesture and content associated with the ambiguous gesture, using the selected magnification amount. In some embodiments, magnifying 625 the area encompassing the ambiguous gesture and the associated content includes generating (e.g., presenting) a magnification window via the display device 125, wherein the magnification window includes the ambiguous gesture and the content associated with the ambiguous gesture. As discussed above, the ambiguous gesture and the content associated with the ambiguous gesture may be magnified, such that the ambiguous gesture and/or the associated content fill the magnification window.

The method 600 then presents 630 a set of candidate gestures within the magnified area (e.g., within the magnification window). In one embodiment, the candidate module 210 presents 630 the set of candidate gestures within the magnified area. In some embodiments, presenting 630 the set of candidate gestures includes identifying a set of candidate gestures based on the ambiguous user-input gesture. For example, the candidate module 210 may compare the user-input gesture to a plurality of candidate gestures and select a set of candidate gestures that most closely match the user-input gesture (e.g., the top three matching candidate gestures).

In certain embodiments, presenting 630 a set of candidate gestures corresponding to the user-input gesture includes presenting a limited number of candidate gestures based on the input gesture. In one embodiment, the number of gestures may be limited to a default and/or user defined number of gestures, such as three, four, or five. In another embodiment, the number of gestures may be based on an area for presenting the candidate gestures, such as display size, screen size, window size, and the like. The limited number of gestures may be selected from the most likely gestures (e.g., best matching the input gesture), most popular gestures, and the like.

The method 600 then determines 635 whether the user selected a candidate gesture. For example, the user may select one of the candidate gestures via a touchscreen portion of the input device 120. As another example, the user may verbally select one of the candidate gestures using a microphone portion of the input device 120. In yet another example, the user may select one of the candidate gestures via a camera portion of the input device 120.

In response to the user selecting a candidate gesture, the method 600 performs 645 an action corresponding to the selected candidate gesture and the method 600 ends. Otherwise, the method 600 receives 640 a new user-input gesture (e.g., via the input device 120) and perform 650 an action corresponding to the newly received gesture. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a touch-sensitive input device that receives a user-input gesture;
a display;

a processor; and
a memory that stores code executable by the processor to:
determine whether the user-input gesture is an ambiguous gesture;
identify a size of the user-input gesture, the size of the user-input gesture comprising at least one of: a length and a number of pixels;
display a magnified area in response to determining that the user-input gesture is an ambiguous gesture, the magnified area encompassing the ambiguous gesture and containing displayed content corresponding to the ambiguous gesture, wherein the magnified area is displayed with an amount of magnification proportional to the size of the user-input gesture;
present a plurality of candidate gestures corresponding to the user-input gesture on the display, in response to the user-input gesture being an ambiguous gesture, each one of the plurality of candidate gestures being a possible interpretation of the user-input gesture;
receive user input in response to presenting the plurality of candidate gestures; and
resolve the ambiguous gesture based on the received user input.

2. The apparatus of claim 1, wherein the code executable by the processor to present the plurality of candidate gestures displays the plurality of candidate gestures within the magnified area.

3. The apparatus of claim 1, wherein the code executable by the processor to determine whether a user-input gesture is an ambiguous gesture determines based on a size of content associated with the user-input gesture.

4. The apparatus of claim 1, wherein the code executable by the processor to determine whether a user-input gesture is an ambiguous gesture:
determines a recognition confidence level for the user-input gesture; and
identifies the user-input gesture as an ambiguous gesture in response to the recognition confidence level being below a threshold level.

5. The apparatus of claim 1, wherein the code executable by the processor to present the plurality of candidate gestures overlays the candidate gesture on content associated with the user-input gesture, and wherein the code executable by the processor to resolve the ambiguous gesture based on user input receives a user selection of an overlaid candidate gesture.

6. The apparatus of claim 1, wherein the memory further comprises code executable by the processor to visually indicate the ambiguous gesture.

7. A method comprising:
receiving a user-input gesture via a touch-sensitive input device;
identifying a size of the user-input gesture, the size of the user-input gesture comprising at least one of: a length and a number of pixels;
identifying displayed content corresponding to the ambiguous gesture, wherein the displayed content comprises one or more of: text, an icon, an image, and an object;
determining, by use of a processor, whether the user-input gesture is an ambiguous gesture, wherein the determination is based at least in part on the size of the ambiguous gesture;
magnifying an area encompassing the ambiguous gesture in response to determining that the user-input gesture is an ambiguous gesture, wherein the magnified area is displayed with an amount of magnification proportional to the size of the user-input gesture;
presenting a set of candidate gestures corresponding to the user-input gesture, in response to the user-input gesture being an ambiguous gesture,
wherein the set of candidate gestures comprises multiple candidate gestures, each candidate gesture being a possible interpretation of the user-input gesture,
wherein presenting the set of candidate gestures comprises displaying the set of candidate gestures within the magnified area,
wherein presenting the set of candidate gestures comprises presenting each of the multiple candidate gestures at an on-screen location near the displayed content corresponding to the ambiguous gesture;
receiving user input in response to presenting the set of candidate gestures; and
resolving the ambiguous gesture based on the received user input.

8. The method of claim 7, further comprising marking one of: the ambiguous gesture and displayed content corresponding to the ambiguous gesture with a visual indication in response to determining that the user-input gesture is an ambiguous gesture, wherein the visual indication comprises one or more of: highlight, color, and underline.

9. The method of claim 7, wherein determining whether a user-input gesture is an ambiguous gesture comprises:
identifying a size of the associated content, and determining whether the size of the associated content is below a threshold size.

10. The method of claim 7, wherein determining whether a user-input gesture is an ambiguous gesture is further based on whether the size of the user-input gesture is below a threshold size.

11. The method of claim 7, wherein presenting the set of candidate gestures comprises overlaying objects corresponding to the set of candidate gestures on additional content surrounding the displayed content corresponding to the ambiguous gesture without obscuring the displayed content corresponding to the ambiguous gesture.

12. The method of claim 7, wherein determining whether a user-input gesture is an ambiguous gesture comprises:
calculating a recognition confidence level for the user-input gesture; and
identifying the user-input gesture as an ambiguous gesture in response to the recognition confidence level being below a threshold level.

13. The method of claim 7, wherein resolving the ambiguous gesture based on user input comprises receiving a user selection of a candidate gesture and performing an action corresponding to the selected candidate gesture.

14. The method of claim 13, further comprising modifying a gesture recognition routine based on the user selection.

15. A program product comprising a computer readable storage medium that is not a transitory signal and that stores code executable by a processor, the executable code comprising code to perform:
receiving a user-input gesture via a touch-sensitive input device;
determining whether the user-input gesture is an ambiguous gesture;
identifying a size of the user-input gesture, the size of the user-input gesture comprising at least one of: a length and a number of pixels;
displaying a magnified area in response to determining that the user-input gesture is an ambiguous gesture, the magnified area encompassing the ambiguous gesture and containing displayed content corresponding to the ambiguous gesture, wherein the magnified area is displayed with an amount of magnification proportional to the size of the user-input gesture;

presenting a plurality of candidate gestures corresponding to the user-input gesture on the display, in response to the user-input gesture being an ambiguous gesture, each one of the plurality of candidate gestures being a possible interpretation of the user-input gesture;

presenting a set of candidate gestures within the magnification window, in response to the user-input gesture being an ambiguous gesture, wherein the set of candidate gestures comprises multiple candidate gestures, each candidate gesture being a possible interpretation of the user-input gesture;

receiving user input in response to presenting the plurality of candidate gestures; and resolving the ambiguous gesture based on the received user input.

16. The program product of claim 15, wherein determining whether a user-input gesture is an ambiguous gesture comprises determining based on a factor selected from the group consisting of: a size of the user-input gesture, a size of content associated with the user-input gesture, and a recognition confidence level for the user-input gesture.

17. The program product of claim 15, wherein resolving the ambiguous gesture based on user input comprises an action selected from the group consisting of: receiving a user selection of a candidate gesture and receiving an additional user-input gesture within the magnified area.

18. The program product of claim 15, further comprising code to perform:

marking one of: the ambiguous gesture and displayed content corresponding to the ambiguous gesture with a visual indication in response to determining that the user-input gesture is an ambiguous gesture, wherein the visual indication comprises one or more of: highlight, color, and underline.

19. The program product of claim 15, wherein presenting the plurality of candidate gestures comprises overlaying objects corresponding to the plurality of candidate gestures on additional content surrounding the displayed content corresponding to the ambiguous gesture without obscuring the displayed content corresponding to the ambiguous gesture.

20. The program product of claim 19, wherein resolving the ambiguous gesture based on the received user input comprises receiving user selection of an overlaid candidate gesture.

* * * * *